United States Patent
Hammer et al.

(10) Patent No.: US 8,700,980 B2
(45) Date of Patent: Apr. 15, 2014

(54) METHOD FOR ENCODING A CONTACTLESS SWITCHING SYSTEM

(75) Inventors: Christian Hammer, Ebermannsdorf (DE); Gerhard Metz, München (DE); Claus Seisenberger, Neufrannhofen (DE)

(73) Assignee: Siemens Aktiengesellschaft, Munich (DE)

( * ) Notice: Subject to any disclaimer, the term of this patent is extended or adjusted under 35 U.S.C. 154(b) by 864 days.

(21) Appl. No.: 12/310,923

(22) PCT Filed: Aug. 21, 2007

(86) PCT No.: PCT/EP2007/058646
§ 371 (c)(1),
(2), (4) Date: Mar. 12, 2009

(87) PCT Pub. No.: WO2008/031693
PCT Pub. Date: Mar. 20, 2008

(65) Prior Publication Data
US 2010/0088555 A1    Apr. 8, 2010

(30) Foreign Application Priority Data
Sep. 13, 2006 (EP) .................................. 06019176

(51) Int. Cl.
*G06F 11/00* (2006.01)
(52) U.S. Cl.
USPC ............ 714/807; 714/799; 714/751; 714/752
(58) Field of Classification Search
USPC ....................................................... 714/807
See application file for complete search history.

(56) References Cited

U.S. PATENT DOCUMENTS

| 5,191,610 | A | 3/1993 | Finn |
| 6,889,297 | B2 * | 5/2005 | Krapp et al. ................. 711/159 |
| 7,289,427 | B2 * | 10/2007 | Steer et al. ................... 370/208 |
| 7,523,305 | B2 * | 4/2009 | Skovira ........................ 713/160 |
| 2002/0078396 | A1 * | 6/2002 | Murphrey et al. ................. 714/6 |
| 2002/0095636 | A1 * | 7/2002 | Tatsumi et al. ............... 714/748 |
| 2004/0217869 | A1 * | 11/2004 | Bouchard et al. .......... 340/573.4 |
| 2006/0282751 | A1 * | 12/2006 | Passint .......................... 714/785 |
| 2007/0074079 | A1 * | 3/2007 | Forster et al. .................. 714/38 |

FOREIGN PATENT DOCUMENTS

| EP | 0808971 A2 | 11/1997 |
| EP | 0982688 A1 | 3/2000 |
| EP | 0570103 B1 | 2/2004 |
| WO | WO 2004047002 A1 | 6/2004 |

* cited by examiner

*Primary Examiner* — Sarai Butler
(74) *Attorney, Agent, or Firm* — Harness, Dickey & Pierce, P.L.C.

(57) ABSTRACT

An embodiment of the invention relates to a contactless switching system and an embodiment relates to a method for encoding same with at least one sensor and at least one signal generator, where the signal generator sends at least one data sequence and the sensor receives the data sequence. In at least one embodiment, an aim is to specify a technical teaching for encoding a contactless switching system inexpensively and in a versatile fashion. To this end, at least one embodiment of the invention proposes anchoring user-implementable encoding in the checksum of the data sequence or the checksum computation code, so that the checksum which the data sequence contains is used to check the quality of the data transmission and at the same time to implement the encoding.

16 Claims, 2 Drawing Sheets

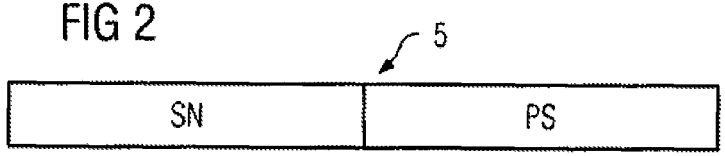
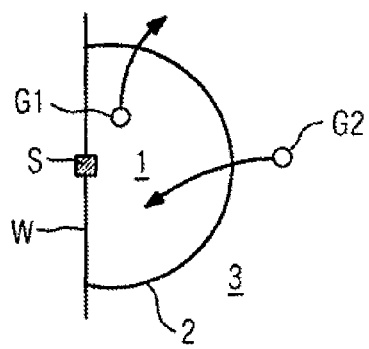
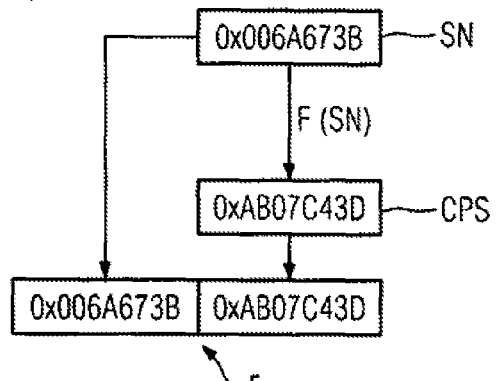
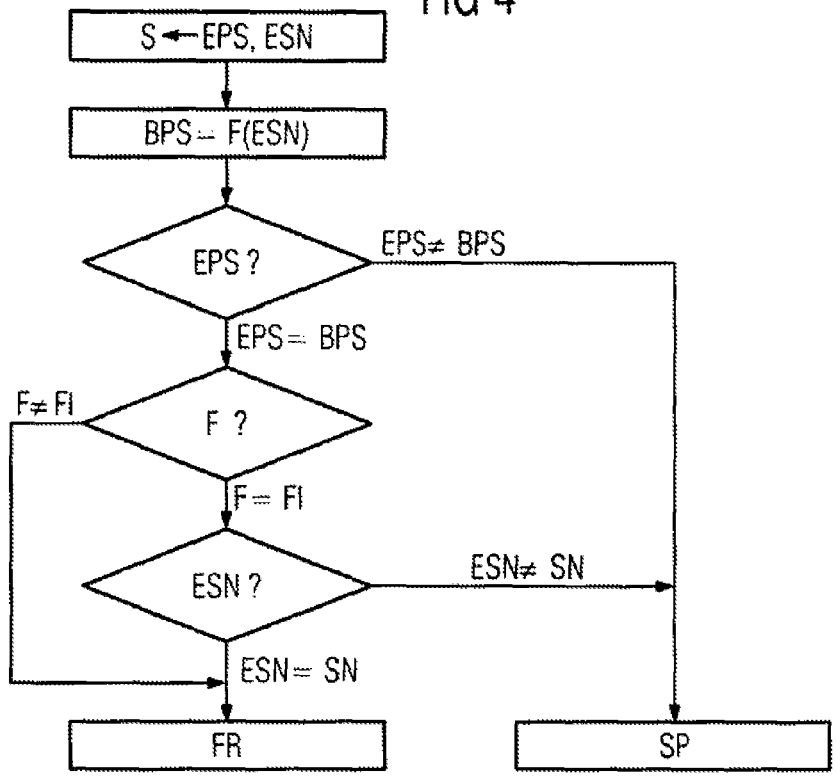

METHOD FOR ENCODING A CONTACTLESS SWITCHING SYSTEM

PRIORITY STATEMENT

This application is the national phase under 35 U.S.C. §371 of PCT International Application No. PCT/EP2007/058646 which has an International filing date of Aug. 21, 2007, which designated the United States of America and which claims priority to European Application No. 06019176.4 which has a filing date of Sep. 13, 2006, the entire contents of which is hereby incorporated herein by reference.

FIELD OF THE INVENTION

At least one embodiment of the invention generally relates to a method for encoding a contactless switching system having at least one sensor and at least one signal generator, wherein the signal generator sends at least one data sequence and the sensor receives the data sequence. At least one embodiment of the invention further generally relates to a contactless switching system and/or a sensor for a contactless switching system of the type.

BACKGROUND

A contactless switching system is implemented for example in the form of a contactlessly acting position or safety switch and is used for monitoring safety-relevant areas or generally for checking the mutual position of two parts, where at least one of the two parts can be moved independently of the other. Typical application scenarios are for example guard doors or protective covers which provide a protective circuit-breaker tripping function in a safety-relevant position.

A contactless position or safety switch consists of at least two mutually independent moving parts which are usually referred to as sensor and signal generator. The communication between sensor and signal generator takes place for example by means of magnetic or also electromagnetic alternating fields.

For example, upon receiving a request from the sensor the signal generator sends a response which contains an identification number or serial number and usually a checksum. The "Cyclic Redundancy Check" (CRC) method, inter alia, is suitable as a possible calculation rule for the checksum. This permits transmission errors to be reliably detected with a high level of probability. The position or safety switch allows access to ("releases") the safety-relevant area only if the signal generator is located within a defined effective range relative to the sensor. A release does not take place if, due to a transmission error, the received checksum does not correspond to the calculated checksum.

At the present time position or safety switches can be operated with different types of encoding schemes. A distinction is made between group encoding, family encoding, individual encoding and master encoding.

In family and group encoding, only one family or, as the case may be, one group of sensors and signal generators match one another. In order to implement the encoding a part of the serial number is usually used for identification purposes, the number allowing a particular family to be inferred when a signal generator enters the effective range. Another possible implementation is a serial number list which is available to the sensor. Only signal generators that have a corresponding serial number trip a safety circuit on the sensor. The family encoding variant is mostly implemented on a manufacturer-dependent basis and prevents flexible use of the signal generators and sensors with products from other manufacturers. As a rule an interaction with products of other manufacturers is not desirable on safety or security grounds and consequently is deliberately avoided.

With individual encoding, one signal generator and one sensor match each other only as a pair. Other sensors or signal generators play no role in this case. The sensor recognizes one serial number only and ignores any signal generator with a different serial number.

With master encoding, a master-encoded signal generator activates both types of sensors from the same manufacturer, individual- and family-encoded. Master-encoded signal generators are intended for use by maintenance personnel during commissioning or maintenance activities. The master-encoded signal generator assumes the function of a master key.

In the present prior art the sensor of the position or safety switch detects the respective encoding type on the basis of the signal generator serial number and proceeds accordingly. In this case the detection based on specific separate or designated areas of the signal generator serial number can be crucial. However, since the serial number of the signal generator cannot be changed, the encoding type is also predefined from the outset. This means that an operation with a specific sensor is only possible in the case of quite specific serial numbers, that is to say when the serial number of the signal generator lies in the sensor's permitted serial number range. Signal generators from other manufacturers may occasionally work with sensors for which they are not intended if by chance they happen to fall into one of the specific serial number ranges.

SUMMARY

At least one embodiment the invention is directed to a versatile implementation of a user-definable encoding type for a contactless switching system for a cost-saving deployment of same.

At least one embodiment the invention is directed to a method wherein the checksum contained in the data sequence is used for checking the quality of the data transmission and for implementing an encoding type.

The principle of operation of the method of at least one embodiment for encoding a contactless switching system is based on a dual function of the checksum. A data sequence that is sent by the signal generator for example in response to a request by the sensor or on account of the presence of a magnetic or electromagnetic alternating field contains, inter alia, a serial number and a checksum. The checksum is used for checking the quality of the data transmission. The implementation of an encoding type, such as e.g. individual encoding, family encoding and/or master encoding, is achieved by means of a corresponding checksum calculation rule. In this case the checksum calculation rule is characteristic of the respective encoding. The length and checksum calculation rule of the checksum can be chosen according to the desired probability of an error-free data transmission and reliable detection of the encoding variant. No distinction is made between family and individual encoding on the signal generator side. For example, a manufacturer- or group-specific checksum calculation rule is used on the signal generator side, wherein the sensor checks only after receiving the data sequence whether the checksum calculation rule used corresponds to the queried encoding type. The assignment as to whether a checksum calculation rule indicates, for example, individual encoding or family encoding is defined within the switching system.

In an advantageous embodiment variant the sensor is family-encoded. A sensor of this kind triggers a switching operation, such as an on/off protection switching operation for example, if a signal generator of a manufacturer or a signal generator that belongs to a specific device group enters the effective range of the sensor.

In an advantageous embodiment variant the sensor is individually encoded. In this case it is necessary to program the serial numbers of the relevant signal generator into the sensor accordingly so that precisely these serial numbers can be recognized by the sensor after the individual encoding has been detected.

In an advantageous embodiment variant the sensor is provided for detecting individually encoded and family-encoded checksums. From the received serial number the respective checksum is formed in the sensor using the matching checksum calculation rule and compared with the received checksum. If the two checksums are identical, then with a probability that is dependent on the checksum calculation rule used and the checksum length, the data transmission from the signal generator to the sensor has been completed without error and at the same time the family or individual encoding has been detected.

In an advantageous embodiment variant any serial number can be used for any encoding variant. No serial number quotas then have to be taken into account for the switch manufacturer or for the device groups. It is even possible to assign signal generators with identical serial numbers to different groups because the two signal generators can be distinguished on the basis of the respective checksums that were calculated using different checksum calculation rules.

Advantageously, the checksum can then be used also both for setting the encoding variant and simultaneously, without additional overhead, for checking that the data transmission was error-free when a signal generator already carries a fixed serial number on the manufacturer side. Since the identification is now verified at least partially by means of the checksum, signal generators with a preset serial number can be used in a flexible manner. The checksum is then entered for example in the freely programmable area of the signal generator.

Advantageously, all or a plurality of family-encoded sensors of the switching system can have the same programming. This is made possible due to the fact that no serial number of a signal generator or a serial number range needs to be stored.

Further advantageous embodiments and preferred developments of the invention may be derived from the description of the figures and/or from the dependent claims.

BRIEF DESCRIPTION OF THE DRAWINGS

The invention is described and explained in more detail below with reference to the example embodiments illustrated in the figures, in which:

FIG. 1 shows a schematic representation of an effective range of a contactless switching system of a first example embodiment, FIG. 2 shows a schematic representation of a data sequence of a signal generator of the first example embodiment, FIG. 3 shows an example generation of a data sequence using a checksum calculation rule of the first example embodiment, FIG. 4 is a flowchart of a sensor programming sequence of a second example embodiment.

DETAILED DESCRIPTION OF THE EXAMPLE EMBODIMENTS

Figure 5:
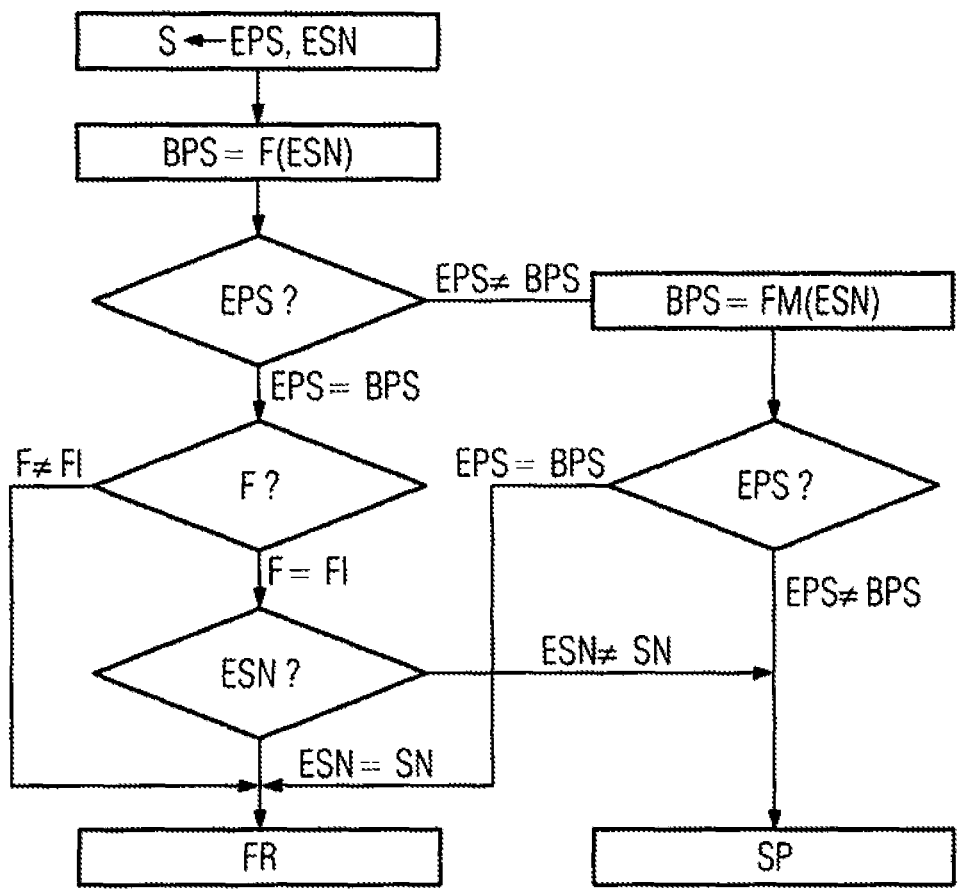
FIG. 5 is a flowchart of a sensor programming sequence with master detection of a third example embodiment.

FIG. 1 shows a schematic representation of an effective range of a contactless switching system of a first example embodiment. The contactless switching system shown has a sensor S on a boundary area W. The effective range of the sensor S extends onto the right-hand side and for simplicity has a semicircle-like shape. The switch-on zone 1 is likewise semicircular and ends at the boundary 2. Reliable detection of a signal generator G1, G2 is possible up to the boundary 2. If the boundary 2 is exceeded, the signal generator G1, G2 is located in the switch-off zone 3. For simplicity the boundary 2 is represented here as a line, whereas in practice an area known as a hysteresis zone separates the switch-on zone 1 from the switch-off zone 3.

The contactless switching system shown has two moving signal generators G1, G2 which can be located alternately in the effective range. Family encoding is advantageous, since the intention is that a switching function is to be triggerable in response to the entry or exit of the first signal generator G1 or the second signal generator G2. For this purpose a checksum calculation rule must be chosen which indicates to the sensor S that the signal generators G1, G2 associated with the switching system are present. The family-encoded sensor S is then also not able to distinguish whether the first signal generator G1 or the second signal generator G2 has triggered a switching function by entering the switch-on zone 1, because there is no necessity to check the serial number itself. With an individually encoded sensor S the checking of the serial number would follow next.

FIG. 2 shows a schematic representation of a data sequence 5 of the signal generators G1, G2 of the first example embodiment. The data sequence 5 represents a very simple form of data sequence which generates a contiguous data block out of the serial number SN and the checksum PS and sends the data block possibly with other data. The checksum PS serves both to verify the errored data transmission from the signal generator G1, G2 to the sensor S and to set the desired encoding variant.

The checksum calculation rule used for generating the checksum PS indicates family encoding within the contactless switching system. However, it does not differ compared with individual encoding for the respective signal generator G1, G2.

FIG. 3 shows an example generation of a data sequence 5 using a checksum calculation rule F of the first example embodiment. From the serial number SN, which in this case is specified as a hexadecimal number (32-bit) by way of example, the checksum calculation rule F generates an encoded checksum CPS. As already shown in FIG. 2, the data sequence 5 is composed of the serial number SN and the checksum PS, in this case the encoded checksum CPS.

In order to ensure a maximally reliable detection of transmission errors, an appropriate CRC algorithm, for example, is used as the checksum calculation rule. As a unique differentiating feature from the other manufacturers (family encoding), the CRC algorithm permits the free choice of the start polynomial (CRC start value) in addition to the choice of the generator polynomial. The reliability of the encoding detection and data transmission increases with the length of the checksum (number of bits), which in this example embodiment has a length of 32 bits.

FIG. 4 shows a flowchart of a sensor programming sequence of a second example embodiment. The sensor is programmed in such a way as to identify the corresponding encoding type. Toward that end the sensor stores the received checksum EPS and the received serial number ESN (see first box of the flowchart).

In the next step an evaluation unit of the sensor forms a calculated checksum, which is generated on the basis of the received serial number ESN and the checksum calculation rule F for family encoding or individual encoding. Next, the received checksum EPS is compared in a query with the calculated checksum BPS. If the two checksums are not identical, a lock SP is applied. If the received checksum is identical to the calculated checksum, the encoding type (individual or family encoding) has been detected. If the sensor is implemented as a pure family-encoded sensor, the check is completed at this point and access to the safety zone is enabled by means of the release circuit FR.

If the sensor is implemented as an individually encoded sensor, a further check must be carried out after the positive checksum check to determine whether a matching signal generator is present. In a further query it is verified whether the received serial number ESN of a known serial number SN which was previously taught to the sensor corresponds to the sensor. If the received serial number ESN is known to the sensor, it will once again trigger a release FR. Non-identification of the received serial number ESN, in contrast, leads to a retention of the lock SP.

If the comparison of the checksums EPS, BPS is not successful, then either the combination "received serial number ESN" and "received checksum EPS" was not received without error or the checksum does not have the corresponding family/individual encoding type. If during the individual encoding the received serial number ESN could not be assigned to a known serial number SN, a release FR is no longer possible. In both cases the contactless switching system, which can be embodied as a position or safety switch, remains locked.

FIG. 5 shows a flowchart of a sensor programming sequence with master detection of a third example embodiment. In the flowchart shown, an additional master detection is implemented supplementary to the flowchart already known from FIG. 4. In the event of an incorrect family/individual checksum, a master checksum is subsequently formed as a calculated checksum BPS using the master checksum calculation rule FM. The new calculated checksum BPS is compared with the received checksum EPS. If the two checksums are not identical, then no master signal generator has been detected and the contactless switching system remains in the locked state (lock SP). If, on the other hand, the received checksum EPS and the checksum BPS calculated using the checksum calculation rule FM are identical, then this leads directly to a release FR of the protection zone.

So that it will not be necessary to repeat a complete checksum calculation from scratch, the master checksum calculation rule FM can be produced from the family/individual checksum calculation rule F by simple extension of the algorithm. An inversion or addition of a constant, for example, lends itself as a possible approach in this case. Advantageously, the reliability of the checksum remains unchanged in the process.

By way of sensor programming according to the flowchart shown it is ensured that both family-encoded and individually encoded sensors detect the master signal generator on the basis of its master checksum.

To sum up, the invention relates to a contactless switching system, and to a method for encoding the same, having at least one sensor and at least one signal generator, wherein the signal generator sends at least one data sequence and the sensor receives the data sequence. A technical teaching for economical and versatile encoding of a contactless switching system is disclosed. To that end it is proposed to anchor a user-implementable encoding in the checksum of the data sequence or the checksum calculation rule such that the checksum contained in the data sequence is used for checking the quality of the data transmission and at the same time for implementing the encoding.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A method for encoding a contactless switching system including at least one sensor and at least one signal generator configured to send at least one data sequence, the at least one sensor configured to receive the at least one data sequence, the method comprising:
   receiving the at least one data sequence including a serial number and an encoded checksum, the encoded checksum being a function of the serial number and a checksum calculation rule, the checksum calculation rule indicating an encoding type of the contactless switching system; and
   detecting an encoding type of the at least one signal generator and checking quality of a data transmission between the at least one sensor and the at least one signal generator using the received serial number and the received encoded checksum,
   wherein the encoding type is at least one of an individual encoding type, a family encoding type and a master encoding type.

2. The method as claimed in claim 1, further comprising:
   storing the received encoded checksum in a freely programmable memory of the at least one signal generator.

3. The method as claimed in claim 1, wherein the detecting further comprises:
   calculating at least one checksum based upon the received serial number using at least one checksum calculation rule; and
   comparing the at least one checksum to the received encoded checksum.

4. The method as claimed in claim 3, wherein the detecting further comprises:
   tripping a circuit if at least one of an individual, family and master encoding type is identified based upon the checksum comparison.

5. The method as claimed in claim 1, wherein the serial number is a unique identification number assigned to each of the at least one signal generators.

6. The method as claimed in claim 3, wherein the detecting further comprises:
   tripping a circuit if the at least one checksum matches the received encoded checksum and the encoding type is a first encoding type.

7. The method as claimed in claim 6, wherein the detecting further comprises:
   comparing the serial number to one or more serial numbers stored in the sensor if the at least one checksum matches the received encoded checksum and the encoding type is a second encoding type; and
   tripping the circuit if the serial number matches the one or more serial numbers stored in the sensor.

8. A sensor for a contactless switching system, the contactless switching system including at least one signal generator, the sensor configured to receive at least one data sequence sent by the at least one signal generator, the sensor comprising:
- a receiver configured to receive the at least one data sequence including a serial number and a first checksum, the first checksum being a function of the serial number and a checksum calculation rule, the checksum calculation rule indicating an encoding type of the contactless switching system; and
- an evaluation unit configured to,
    - check quality of a data transmission between the at least one signal generator and the sensor,
    - detect an encoding type of the at least one signal generator based upon the received serial number and the received first checksum, and
    - calculate a second checksum from the received serial number using the checksum calculation rule,
        - wherein the encoding type is at least one of an individual encoding type, a family encoding type, and a master encoding type.

9. The sensor as claimed in claim 8, wherein the evaluation unit is further configured to compare the received first checksum with at least the second checksum.

10. The sensor as claimed in claim 8, wherein the evaluation unit is further configured to obtain the first checksum from a freely programmable portion of the data sequence of the at least one signal generator.

11. A contactless switching system, comprising at least one signal generator and at least one sensor as claimed in claim 8.

12. The contactless switching system as claimed in claim 11, wherein the contactless switching system is a contactless position or a safety switch.

13. The sensor as claimed in claim 8, wherein the received serial number is a unique identification number assigned to each of the at least one signal generators.

14. The sensor as claimed in claim 9, wherein the evaluation unit is further configured to trip a circuit if the second checksum matches the received first checksum and the encoding type is a first encoding type.

15. The sensor as claimed in claim 14, wherein the evaluation unit is further configured to compare the serial number to one or more serial numbers stored in the sensor if the second checksum matches the received first checksum and the encoding type is a second encoding type, and configured to trip the circuit if the serial number matches the one or more serial numbers stored in the sensor.

16. The sensor as claimed in claim 8, wherein the evaluation unit is further configured to,
- compare the second checksum to the received first checksum; and
- compare the serial number to one or more serial numbers stored in the sensor if the second checksum matches the received first checksum.

* * * * *